Figure 1:
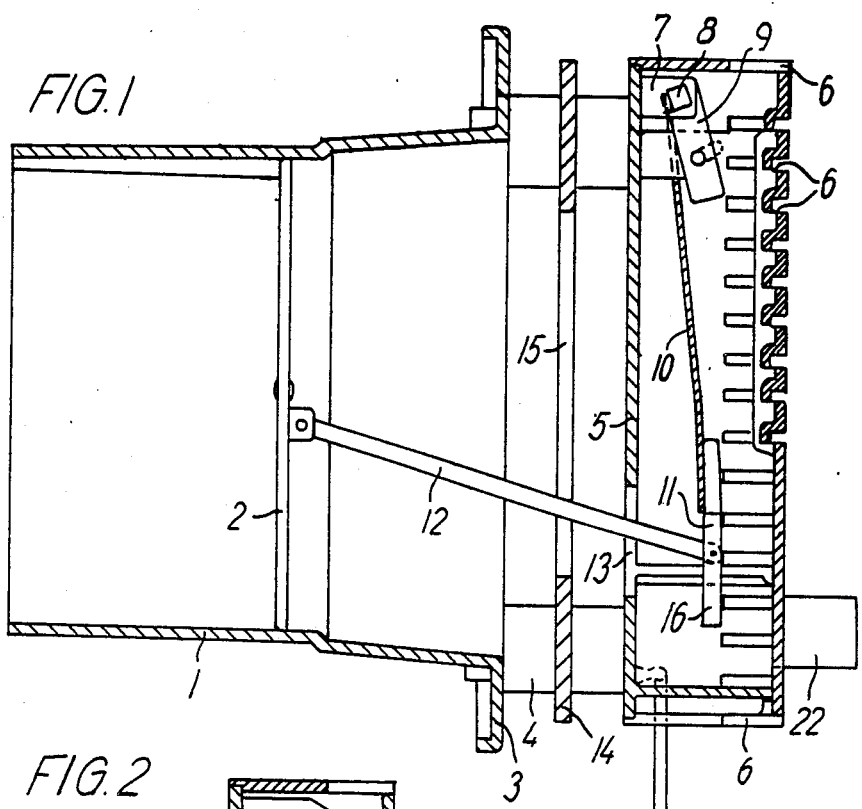

United States Patent [19]

Nielsen et al.

[11] Patent Number: 4,674,680

[45] Date of Patent: Jun. 23, 1987

[54] VALVE DEVICE FOR THE AUTOMATIC CONTROL OF AN AIR INTAKE DEPENDENT ON VARYING HUMIDITY

[75] Inventors: Per G. Nielsen, Horsens; Elgard Nielsen, Østbirk, both of Denmark

[73] Assignee: V. Kann Rasmussen Industri A/S, Soborg, Denmark

[21] Appl. No.: 841,528

[22] PCT Filed: Jul. 2, 1985

[86] PCT No.: PCT/DK85/00063

§ 371 Date: Feb. 26, 1986

§ 102(e) Date: Feb. 26, 1986

[87] PCT Pub. No.: WO86/00687

PCT Pub. Date: Jan. 30, 1986

[30] Foreign Application Priority Data

Jul. 5, 1984 [DK] Denmark .............................. 3303/84

[51] Int. Cl.⁴ ............................................ G05D 22/00
[52] U.S. Cl. .................................... 236/44 A; 251/89
[58] Field of Search ................ 236/44 R, 44 A, 49; 251/14, 89, 129.03, 298

[56] References Cited

U.S. PATENT DOCUMENTS

| 2,284,380 | 5/1942 | Drabble | 251/89 X |
| 2,702,504 | 2/1955 | Guildford | 251/89 X |
| 2,704,947 | 3/1955 | Hopkins | 251/14 X |
| 3,780,940 | 12/1973 | Genbauffe | 251/89 X |
| 4,231,389 | 11/1980 | Still et al. | 251/89 X |
| 4,460,122 | 7/1984 | Jardinier et al. | 236/44 |
| 4,515,308 | 5/1985 | Jardinier et al. | 236/44 A X |

FOREIGN PATENT DOCUMENTS

| 686 | 1/1887 | France . |
| 1042627 | 9/1950 | France . |
| 126095 | 10/1970 | Norway . |
| 798350 | 7/1956 | United Kingdom . |

Primary Examiner—William E. Tapolcai
Attorney, Agent, or Firm—Lane & Aitken

[57] ABSTRACT

In a fresh air valve device having a throttle valve member (2) controlled by a humidity sensitive member (10), the control may be interrupted by means of a manual adjusting device (17) for compulsory opening and compulsory closing of the valve member.

9 Claims, 3 Drawing Figures

U.S. Patent  Jun. 23, 1987  Sheet 1 of 2  4,674,680

VALVE DEVICE FOR THE AUTOMATIC CONTROL OF AN AIR INTAKE DEPENDENT ON VARYING HUMIDITY

This invention relates to a valve device for the automatic control of an air intake dependent on varying humidity with a view to maintain a desired degree of humidity in a room, comprising a throttle valve mounted in an air intake conduit and operatively connected with a humidity sensitive member exposed to room air and consisting of a sheetlike laminate which at varying humidity content tends to change curvature.

Such a valve device is known from EP-A2-0068917, in particular FIG. 5 thereof, in which the air intake conduit is controlled by a resilient valve plate atempting to keep the conduit closed and which by means of a pull cord is connected with a humidity sensitive laminate plate mounted in a coextensive conduit through which the humidified air is allowed to flow. By increasing curvature due to increasing content of humidity in the room air the laminate plate overcomes the spring force of the valve plate, thereby compelling this plate to move in the opening direction.

The present invention particularly pays regard to the fact that it may be desirable under certain circumstances to interrupt the automatic control of the valve. For example, there may be some need for intake of fresh air even at a comparatively low degree of humidity in the room air, i.e. when the humidity sensitive member attempts to keep the valve closed, or it may be desirable to keep the valve in its closing position against outer wind pressures, even though the degree of humidity in the room should cause an opening.

The purpose of the invention is fulfilled in that the humidity sensitive member is associated with a manual adjusting device which in its extreme positions is adapted to cause a compulsory closing and compulsory opening, respectively, of the valve by overcoming the tendency of the humidity sensitive member to change its curvature and, in an intermediate position has no effect thereon.

Under normal conditions the manual adjusting device is in its intermediate position so that the device in principle operates in the same manner as the above mentioned prior device, i.e. providing for an enhanced and reduced fresh air intake at increasing and decreasing degree of humidity in the room air, but an interruption of said automatic operation only requires a simple shifting of the adjusting device in the one or the other direction, in dependence on whether it is desired to keep the valve open or closed.

The humidity sensitive member may in a known manner be a metal sheet laminated with wood veneer and, as is also the case with the above mentioned prior design, at least at one end edge that is parallel to the fibre direction of the wood it may be so mounted in a housing through which the humidified room air flows that it may freely, i.e. unimpeded by the mounting means, assume a curvature corresponding to the actual degree of humidity, and at a point spaced from the mounting it may be operatively connected with the throttle valve. In this case it is preferred, according to the invention, that the operative connection includes a rigid rod which at the humidity sensitive member is associated with a pin projecting from an edge of said member and engaging a guideway provided in the manual adjusting device and allowing, in the center position of said device, an unimpeded movement of the pin between its positions corresponding to fully open and fully closed throttle valve and causing, by movement of the device away from the center position, a compulsory lateral displacement of the pin and thus also a compulsory opening and closing, respectively, of the valve.

This entails a relatively simple and safely operating structure that may be of a very compact design so that the overall dimensions of the valve device may be kept appropriately small, particularly in case the manual adjusting device is a slide located in the housing and controlled to be displaced in a direction parallel to the edge adjacent the humidity sensitive member, and the guideways of which form an angle of about 45° with said direction.

Figure 2:
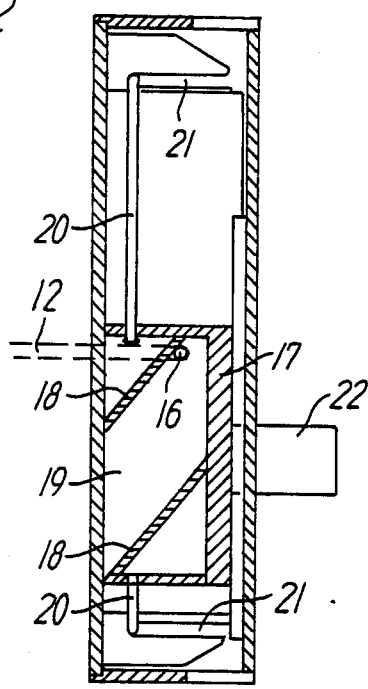
Figure 3:
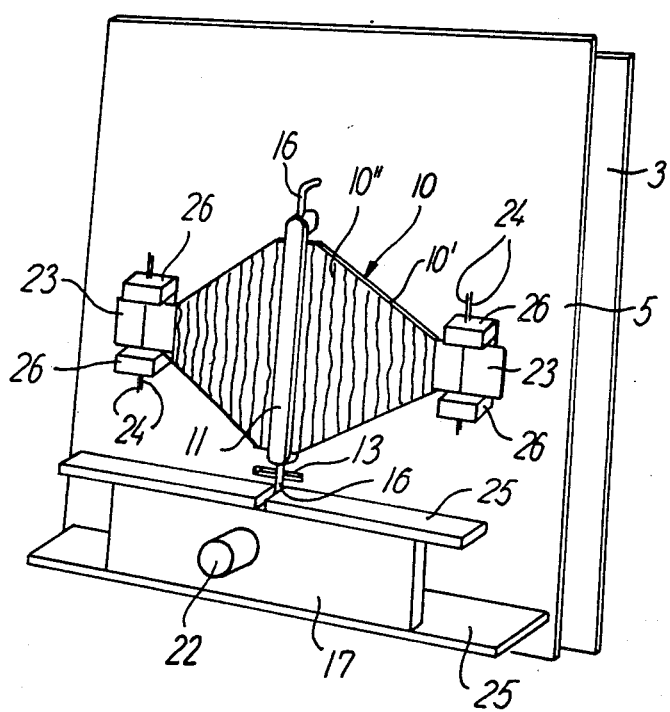

Two embodiments of the valve device according to the invention are illustrated on the drawings, in which FIG. 1 is a vertical sectional view of the device in a first embodiment without the said slide, FIG. 2 is a horizontal partial view including the slide, and FIG. 3 illustrates the valve device in the second embodiment, in a perspective view from the front and with the front wall of the housing omitted.

In FIG. 1, 1 designates a tube adapted to be mounted in a wall aperture and constituting the above mentioned fresh air conduit. It accommodates an ordinary pivoted throttle valve member 2 which from the illustrated closed position may be tilted to a horizontal, fully open position that is merely indicated by a dotted line.

Through a mounting plate 3 with projecting bosses 4 the tube 1 is connected with the rear wall 5 of a housing whose front wall and lateral walls are provided with holes or slits 6 allowing the room air to flow into the interior of the housing.

A square shaft 8 is mounted in a pair of flanges 7 at the top of the housing and may be held in one or more positions by means of a locking mechanism 9. The square shaft carries a thin, laminated wooden plate 10 which tends to become curved, or increasingly curved, when subjected to moistening, the plate being secured to the square shaft along an edge which is parallel to the general fibre direction of the wood. By a preferably releasable bracket 11 at its opposite edge the plate 10 is connected with the valve member 2 through a rod 12 extending through a slit 13 in the rear wall 5 of the housing in order to cause the valve to open when the plate 10 becomes more moist, thereby being further curved so that its lower portion approaches the rear wall 5 of the housing.

An intermediate plate 14 having an opening 15 of appropriate size is further mounted on the bosses 4. In the space provided between the rear wall 5 of the housing and the intermediate plate an upwardly directed flow of room air may be effected which eliminates the cooling effect of the fresh air on the rear wall, thereby preventing condensate from depositing within the housing.

The bracket 11 is provided with a downwardly directed pin 16 engaging a slide 17 positioned at the bottom of the housing and not shown in FIG. 1, but illustrated in a horizontal sectional view in FIG. 2. Said slide is displaceable parallel to the lower edge of the plate 10 and comprises a pair of vertical oblique walls 18 whose angle in relation to the direction of displacement is about 45° and which between themselves form a wide guideway 19 in which the pin 16 is received. A cord 20 serves to displace the slide and is passed through a pair of slits 21 in the bottom of the housing. The slide may further, as illustrated, have a knob 22 projecting through a slit in the front wall of the housing, said knob being alternatively used for manual displacement of the slide and being adapted to provide a visible indication of its position. If desired, the device may further comprise an independent indicator for the position of the valve, for instance a rotating indicator activated magnetically, in that the magnet may then appropriately be located at the lower edge of the wooden plate 10.

In FIG. 2 the slide 17 is illustrated in the position corresponding to closed valve. A movement of the pin 16 to the left is impeded by the upper one of said two oblique walls 18, and a moistening of the humidity sensitive plate 10 will therefore be without influence on the position of the valve member 2. When the slide is displaced upwardly in FIG. 2, the pin 16 attains a successively increasing clearance of movement until it gets clear of both oblique walls in the center position of the slide. By a continuous displacement of the slide in the same direction the lower oblique wall engages the pin 16 which will finally be held in a position corresponding to fully open valve 2.

For the sake of completeness it should be mentioned that instead of the displaceable slide 17 a rotatable slide with a correspondingly modified guideway may be used.

In order that the humidity sensitive plate 10 may safely keep the valve 2 closed at low air humidity and with the slide 17 in the center position, the plate should in this situation be pre-stressed to a certain degree. This may cause a retarding of the valve movement when the plate is being moistened and may also cause an overloading of the plate when the valve is forced open by means of the slide 17 which is accompanied by a compulsory curvature of the plate.

These effects can be avoided by the embodiment of the valve device illustrated in FIG. 3 in which analogous elements have the same reference numerals as in FIGS. 1 and 2.

In FIG. 3 the humidity sensitive member 10 is almost rhombic and consists of a laminate of a rear plate 10′ insensitive to humidity and having an appropriate inherent rigidity, preferably a thin metallic plate, and a piece of wood veneer 10″ that, however leaves the rear plate uncovered at the end edge portions parallel to the fibre direction of the wood. Said end edge portions constitute mounting flanges 23 having a reduced width parallel to the fibre direction of the wood and each engaging between a pair of needles 24 inserted through vertical holes in bearing bosses 26 on the rear wall 5 of the housing. Said bosses may possibly comprise several holes for accommodating the humidity sensitive member at an optional distance from the rear wall with a view to adjusting the effective field of operation of said member which may for instance be within the region from 45 to 65% relative humidity corresponding to closed and fully open valve 2, respectively.

The explained accommodation entails that the member 10 when being moistened may freely curve or arch forwardly from the rear wall 5 and thus via the pin 16 may carry along the connecting rod not shown in FIG. 3 (12, FIG. 1) for adjusting the valve position. Through a transverse slit in the upper one of two rails 25 mounted on the rear wall 5 and guiding the slide 17, the pin 16 is extended downwardly to the guideway 19 of the slide, FIG. 2. In this embodiment the pin 16 is substantially parallel to the fibre direction of the veneer 10″ and is secured to the member 10 intermediate its ends by means of a stirrup 11 mounted on the front surface of said member and having backwardly directed ears provided with holes adapted to receive the pin. By varying humidity conditions in the member 10 the pin 16 is forced to effect a substantially translatorial movement in the form of a transverse displacement towards and away from the rear wall 5.

In this case too, a compulsory closing or a compulsory opening will cause a certain deformation of the member 10, but such a deformation may at any rate be substantially reduced to a torsion of the flanges 23 so that no overloading of the humidity sensitive veneer coating 10″ occurs. The reduced width of the flanges 23 in the fibre direction of the wood, as referred to above, for instance of about a fifth or a sixth of the width of the member at its middle portion may provide a torsional resistance of appropriate size.

We claim:

1. A valve device for the automatic control for the intake dependent on varying humidiity in order to maintain a desired degree of humidity in a room, comprising:
   a throttle valve mounted in an air intake conduit,
   a humidity sensitive member exposed to the room air and comprising a sheetlike laminate which at varying humidity content tends to change its curvature,
   means for operatively connecting said throttle valve with said humidity sensitive member, and
   a manual adjusting device associated with said humidity sensitive member and movable between two extreme positions in which said manual adjusting device keeps said throttle valve closed and open, respectively, by overcoming the tendency of said humidity sensitive member to change its curvature, said manual adjusting device also having an intermediate position in which said manual adjusting device is operatively disconnected from said throttle valve.

2. A valve device for the automatic control of an air intake dependent on varying humidity in order to maintain a desired degree of humidity in a room, comprising:
   a throttle valve mounted in an air intake conduit;
   a housing associated with said intake conduit and open to the humidified air in the room,
   a humidity sensitive member in said housing tending to change its curvature in response to changes in humidity, said humidity sensitive member comprising a metal sheet laminated with wood veneer having a fibre direction, said humidity sensitive member presenting at least one edge which is parallel to the fibre direction of the wood;
   mounting means associated with said edge and allowing said humidity sensitive member to freely assume a curvature corresponding to the actual degree of air humidity; and
   means for connecting said humidity sensitive member, at a point spaced from said mounting means, with said throttle valve, said connecting means including a rigid rod associated with a pin projecting from an edge of said humidity sensitive member and engaging a guideway provided in a manual adjusting device which is movable to various positions, including an intermediate position, in which said manual adjusting device allows an unimpeded movement of said pin between positions corresponding to fully open and fully closed positions of said throttle valve, said manual adjusting device also being movable to other positions in which said manual adjusting means causes compulsory lateral displacement of said pin and thus also a compulsory opening and closing, respectively, of said throttle valve.

3. A valve device as claimed in claim 2, wherein said humidity sensitive member has an edge adjacent to said manual adjusting device, and said manual adjusting device is a slide located in said housing and guided for displacement in a direction parallel to said adjacent edge of said humidity sensitive member, the guideway of said slide forming an angle of about 45° with said direction.

4. A valve device as claimed in claim 2, wherein said mounting means is provided at only one edge of said humidity sensitive member, said humidity sensitive member has an edge opposite said one edge, and said pin is secured to and protrudes from said opposite edge of said humidity sensitive member.

5. A valve device as claimed in claim 2 wherein said humidity sensitive member has two opposite end portions having edges parallel to the fibre direction of the wood, said mounting means comprises bearing means in said housing for movably mounting said end portions to permit, in response to increasing humidity, arching of said humidity sensitive member away from a plane defined by said bearing means, the pin associated with the connecting rod being parallel to the fibre direction and being supported by said humidity sensitive member intermediate said end portions.

6. A valve device as claimed in claim 5, wherein the end portions of said humidity sensitive member comprise flanges of said metal sheet extending beyond said veneer, and said bearing means comprises bearings defining slits, each said end portion extending into one of said slits.

7. A valve device as claimed in claim 6, wherein the dimension of said flanges parallel to the fibre direction of the wood veneer is about one sixth of the corresponding dimension of said humidity sensitive member intermediate said flanges.

8. A valve device as claimed in claim 5, wherein each of said slits is defined by a pair of parallel needles.

9. A valve device as claimed in claim 8, wherein the space between the needles is variable.

* * * * *